July 4, 1939.  J. M. CHRISTMAN  2,164,573
TOOL
Filed Dec. 21, 1936  2 Sheets-Sheet 1
FIG. 1.
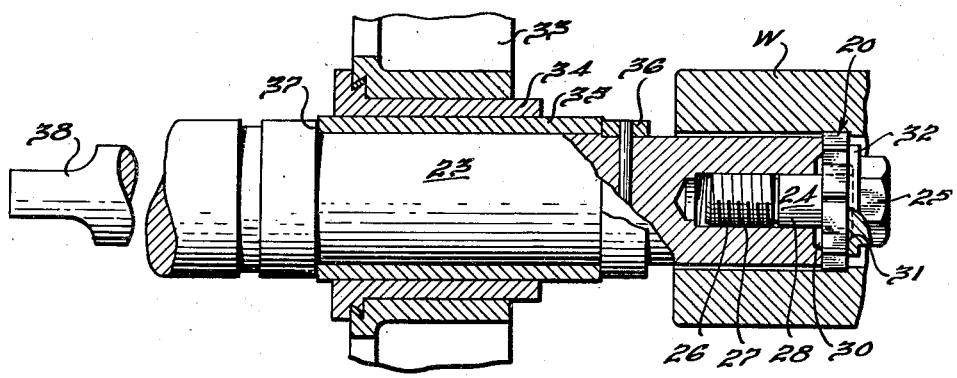
FIG. 2.
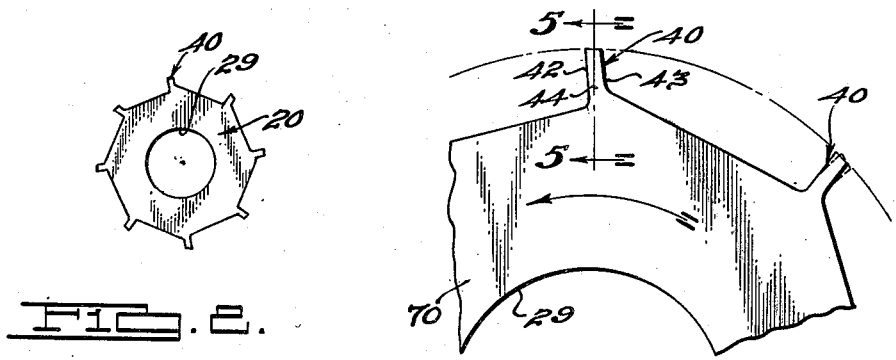
FIG. 3.
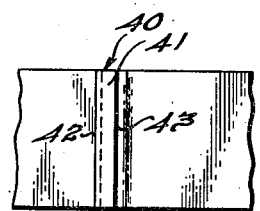
FIG. 4.
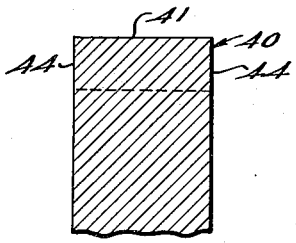
FIG. 5.
INVENTOR.
John M. Christman.
BY Tibbetts & Hart
ATTORNEYS.

July 4, 1939. J. M. CHRISTMAN 2,164,573
TOOL
Filed Dec. 21, 1936 2 Sheets-Sheet 2
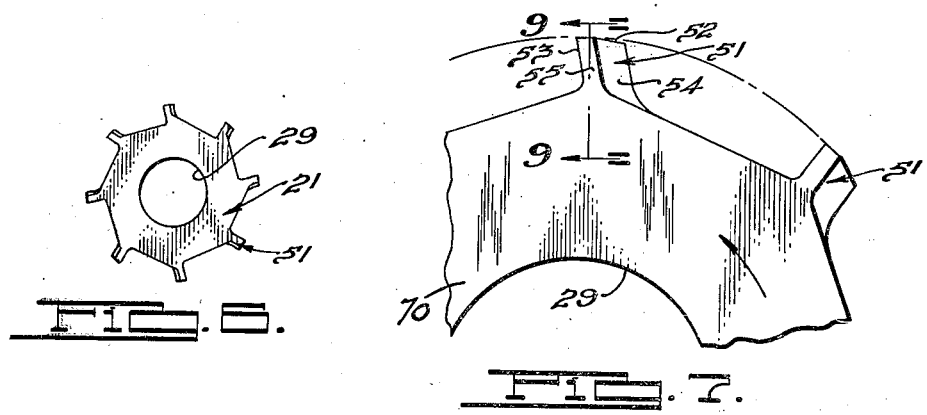
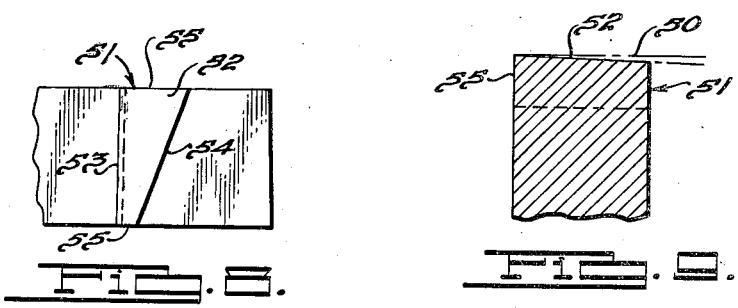
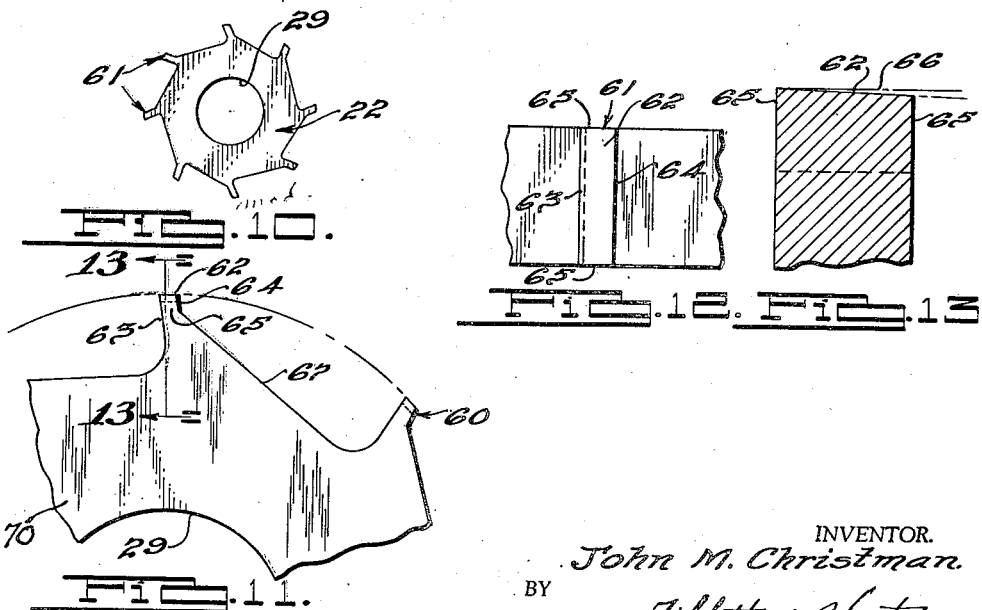
INVENTOR.
John M. Christman.
BY
Tibbetts & Hart
ATTORNEYS.

Patented July 4, 1939

2,164,573

UNITED STATES PATENT OFFICE 2,164,573

TOOL

John M. Christman, Detroit, Mich., assignor to Packard Motor Car Company, Detroit, Mich., a corporation of Michigan Application December 21, 1936, Serial No. 116,907

12 Claims. (Cl. 29—103)

This invention relates to cutting tools and more particularly to tools for changing circumferential dimensions of pieces of work.

My Patent No. 2,087,231 issued July 20, 1937, and my application Serial No. 110,827, filed November 14, 1936, are directed to cutting tools for increasing and decreasing respectively the diameter of circumferential surfaces of pieces of work when rotated and moved axially. Such tools utilize cutting edges on the ends of the teeth that are formed normal to the axis, the lands of the teeth lying on a circle struck from the tool axis and having a substantial width between the leading and following sides. The lands follow the cutting edges of the teeth in operating upon a piece of work and bear against the newly formed circumference of the work in a manner such that they function to provide a bearing for centering the tool relative to the work. It is necessary with such tools that the circumferential dimension of the lands of the teeth be sufficient to give a substantial strength behind the leading or cutting edges to prevent their breakage while operating. In the cutting operations on some kinds of metal, for example certain types of steel and cast iron, I have found that the land contact of the cutter teeth with the newly cut surface on the work will rub off particles of metal therefrom and that such particles will "seize" or "freeze" on the lands and cause gouging of the newly cut surface resulting in an undesirable rough surface finish.

It is an object of my invention to provide tools, of the character referred to, with teeth such that dislodging and collecting of metal particles by the lands will be materially lessened.

Another object of my invention is to provide tools, of the character referred to, with rugged teeth capable of forming smooth circumferential surfaces on pieces of work irrespective of the kind of material operated upon.

Another object of my invention is to provide tools of the character referred to, with teeth that are sufficiently flexible so that the following portion of the lands are bent out of contacting relation with the surface cut on the piece of work during operation of the tool.

Another object of my invention is to provide tools, of the character referred to, with rugged teeth each having a very small peripheral surface adjacent the cutting edge.

Other objects of the invention will appear from the following description taken in connection with the drawings which form a part of this specification, and in which:

Fig. 1 is a view, partly in section, of a rotary tool constructed in accordance with my invention and in boring relation with a piece of work;

Fig. 2 is a side view of the cutter or cutting member shown in Fig. 1;

Fig. 3 is a fragmentary side view of the cutter shown in Fig. 2, very much enlarged;

Fig. 4 is a top view of a portion of the cutter shown in Fig. 3;

Fig. 5 is a sectional view taken on line 5—5 of Fig. 3;

Fig. 6 is a side view of a modified form of cutter;

Fig. 7 is a very much enlarged segment of the cutter shown in Fig. 6;

Fig. 8 is a top view of the cutter section shown in Fig. 7;

Fig. 9 is a sectional view taken on line 9—9 of Fig. 7;

Fig. 10 is a side view of another modified form of cutter;

Fig. 11 is a very much enlarged fragmentary view of the cutter shown in Fig. 10;

Fig. 12 is a top view of the cutter shown in Fig. 11;

Fig. 13 is a sectional view taken on line 13—13 of Fig. 11.

Referring to the drawings, three types of cutters or cutting members of the rotary tool are indicated generally at 20, 21 and 22, each of which consists of a body 10 having the periphery fluted to form spaced teeth. These tools can each be mounted in the same manner upon a bar or support 23 as by bolt 24, the bolt having a hex head 25 in contact with the cutter and a threaded portion 26 screwed into the threaded portion 27 of the support. The bolt has a smooth cylindrical portion 28 fitting closely in a similar portion of the support and extending through a cylindrical opening 29 in the applied cutter. The support 23 immediately back of the applied cutter is preferably of a diameter such that its periphery extends around the base of the cutter teeth and thus provides as large a radius of contact with the cutter as possible and driving the cutter without keying it thereto. To insure full surface contact near its periphery, the end face of the bar is relieved slightly at 30. For the same purpose the bolt head 25 is undercut as at 31, and in order that clearance may be provided for the chips which move forward with this type of cutter, the bolt head 25 is smaller in diameter at its flange 32 than is the bar 11 on the other side of the cutter, and still smaller at the hex portion.

With this construction it will be seen that not only is the cutter centered upon and adapted to be secured to the support, but if the bolt 24 is not originally tightened to the desired degree the first cutting operation of the tool will cause the bolt to thread further into the bar and automatically tighten the cutter on its support. With this construction the cutter will be equally clamped at all points so that it is more easily applied to the support than would be the case if a key or spline were used, and since no keyway is formed in the cutter and the cylindrical opening 29, the spaces between the teeth are the only cutaway parts of the cutter and the latter will not go out of round and will not be weakened by unequal or notched body form.

The work upon which a cutter is operating is indicated at W, and the tool is shown as reaming out stock from around a hole that has already been formed in the work.

A carrier 33 is provided for the supporting bar 23 and this carrier has a sleeve 34 in which is slidingly telescoped a sleeve 35. A pinned collar 36 retains the sleeve 35 on the support 23 against a shoulder 37. The support or bar is formed at its opposite end with a drive shank 38 by which it may be rotated and moved endwise into and through the work.

The cutters or cutting members 20, 21 and 22 are shown in the form of an annulus or disk that is of a width about one-fifth or one-sixth its diameter, however this shape is not essential. They may be even thinner than this, depending largely upon how they are to be made, that is, whether by stamping them out of sheet metal or by forming them from a bar. The cutters may be made by boring a metal bar, cutting or rolling the teeth on the bar, and then cutting the individual disks from the bar. If the teeth of the cutters are to be formed into disks after stamping or cutting, several of them may be mounted together on a bar and the teeth of all cut at one time. The teeth may be evenly spaced or a slight unevenness may be effected to prevent chatter against the work while in use.

The teeth of cutter 20, illustrated in Fig. 2, are shown greatly enlarged in Figs. 3 to 5 inclusive. These teeth extend across the outer peripheral face of the disk or annulus and they may be formed parallel to the axis of the disk, or approximately so, or they may be spiralled. They could also extend across the inner peripheral face of the cutter in the same manner.

A cutter tooth in the embodiment of the invention shown in Figs. 2 to 5 inclusive, is indicated at 40. Its form is defined by the land 41, the leading side 42, the following side 43, and the ends 44. The junction formed by the end and leading side of each tooth provides a cutting edge for operating upon work. In the present invention the ends of the teeth are ground normal to the axis of the annulus and the cutting ends of the teeth are in the same plane and normal to the axis so that the cutting ends 44 press equally against the work when engaged therewith. Because of this formation of the cutting edges, each side of the cutter body and the adjacent ends 44 of the teeth can be ground in a plane normal to the axis of the annulus. This permits a single surface grinding operation in forming all of the cutting edges of the teeth.

The lands 41 of the teeth are formed to lie in a circle struck from the cutter axis on any cross section, and these lands can be so ground while the cutter is rotating about its axis. When the cutting edges of the teeth become worn they can be relocated, that is reformed, by grinding the cutting side of the cutter normal to its axis and such reconditioning can be done in the manner set forth in my previously mentioned applications.

The leading side 42 and the following side 43 of each tooth are arranged in substantially parallel relation throughout their length and they are arranged relatively close to provide a narrow tooth width in a circumferential direction. These teeth are relatively long in a radial direction.

The relatively small circumferential dimension and the relatively long radial dimension of the teeth permits circumferential flexing thereof when operating upon a piece of work, this flexing being of course greatest at the cutting end. This flexing of the teeth will of course be in a direction opposite to that in which the cutter is being rotated, the direction of rotation being indicated by the arrow and a flexed tooth being indicated in dotted lines in Fig. 3. This flexing of the teeth will place the greater portion of the lands, immediately behind the cutting edges, interiorly of the surface just formed by the cutting edges.

I have found that the cutting operation raises the temperature of the metal operated upon and that engagement of the land surface of the teeth with this heated surface is one of the causes for the "gumming-up" of material from the piece of work on the land surfaces of the cutter teeth. Due to this permitted flexing of the teeth in operation, the lands or peripheral surfaces of the teeth are moved inwardly away from the surface cut on the piece of work and there will be no rubbing action of the lands with such surface tending to cause "gumming-up" of material from the piece of work on the teeth lands. As a result the tool provides mainly a cutting action and practically no rubbing against or burnishing of the cut surface.

Another form of the cutter incorporating the invention is shown in Figs. 6 to 9 inclusive, and this cutter is indicated generally by the numeral 21. In Figs. 7 to 9 inclusive, a tooth is shown greatly enlarged and in this form of the invention the teeth form the outer circumference of the annulus and they extend the entire width of the cutter, that is, the entire axial length thereof, just as with the previously described form of the invention. In this form of the invention the teeth can also be formed on the inner periphery of the cutter. The teeth are relatively similar in conformation and the peripheral faces thereof are formed with back taper, as indicated greatly exaggerated by the dotted lines 50 in Fig. 9.

The teeth of the cutter 21 are indicated generally at 51 and their form is defined by the land 52, the leading side 53, the following side 54 and the ends 55. The junctions formed by the ends and the leading sides of the teeth at one side of the cutter provide cutting edges for operation upon work. In the present form of the invention, the ends of the teeth of the cutter are ground normal to the axis of the annulus and the adjacent ends of the teeth are in the same planes and normal to the axis so that the cutting edges, at one side of the cutter, press equally against the work when engaged therewith. The sides of the tool, including the ends of the teeth 64, are preferably ground in a plane normal to the axis of the annulus and this permits a single surface grinding operation to form all of the cutting edges of the teeth at one side of the cutter and it also allows a similar grinding operation to relocate the cutting edges when they become worn. The lands 52 of the teeth, on any cross section, lie in a circle struck from the axis on which the cutter is rotated and these lands can be so ground while the cutter is rotating.

The form of the tooth illustrated in this embodiment of the invention is preferably such that the leading side 53 extends substantially parallel with the axis of the cutter. The following side 54 diverges from the leading side in a direction away from the cutting side of the cutter. In other words, the circumferential dimension of the teeth at their front or cutting end is considerably less than the circumferential dimension thereof at their rear end. Because of this tooth formation the peripheral surface following the cutting edge into a piece of work will have a relatively small circumferential dimension and there will therefore be small opportunity for material from the surface just cut on a piece of work to "gum-up" or seize thereon. The increasing circumferential dimension of the teeth toward their rear ends provides sufficient reinforcement for the cutting ends to prevent their breakage when operating upon a piece of work. Because of the back taper 50 on these teeth, the major portion of the land surfaces of the teeth following the cutting edges into work will bear lightly against the surface in the work just formed. A very small peripheral surface on each tooth will engage the surface formed by the cutting edges of the teeth of this form of tool and, consequently, the collection on the teeth lands of metal particles from the finished surface will be extremely small.

In Figs. 10 to 13 inclusive, is shown another form that the invention can take. The shape of the teeth of this cutter 22 is best illustrated in Figs. 11 to 13 inclusive, wherein a tooth is shown greatly enlarged.

In this form of the invention the teeth form the outer circumference of the annulus and they extend the entire width of the cutter, that is, the entire axial length thereof. Such teeth can be similarly arranged on the inner circumference of the annulus. These teeth are preferably similar in conformation relatively.

The cutter teeth are indicated generally at 61. Their form is defined by the land 62, the leading side 63, the following side 64, and the ends 65. The junctions formed at one side of the cutter by the ends and the leading sides of the teeth provide cutting edges for operation upon work. The ends of the teeth are ground normal to the axis of the annulus and the ends of the teeth at each side of the cutter are in the same plane and normal to the cutter axis so that the cutting ends of the teeth press equally against the work when engaged therewith. The entire surface of the cutting face of the cutter, including the ends 65 of the teeth, is preferably ground in a plane normal to the axis of the annulus and this permits a single surface grinding operation in forming all the cutting edges of the teeth.

The lands 62 of the teeth, on any cross section, are on a circle struck from the cutter axis and these lands can be so ground while the cutter is rotating. When the cutting edges of the teeth become worn they can be relocated, that is reformed, by axially grinding away the worn face of the cutter until the worn portion is removed. This reconditioning of the cutter can be done in the manner set forth in my previously mentioned application.

The leading side 63 and the following side 64 of each tooth extend relatively in a parallel relation throughout their length and they are spaced relatively close together in a circumferential direction. The lands of these teeth are preferably provided with back taper, the extent of which is indicated exaggerated by the dotted lines 66 in Fig. 13. The following side 64 is relatively short in a radial direction, and the adjacent base 67 of the tooth extends at an angle toward the adjacent following tooth and provides a reinforcement for the narrow tooth resulting in sufficient strength to prevent breakage when operating upon work.

Because of the narrow land portions of the teeth and the back taper, there is a very small peripheral tooth surface and, consequently, the adherence of metal thereto from the newly cut surface of the work will be substantially eliminated.

In each of the forms of the invention, the cutting ends of the teeth are narrow and the sides of the teeth at such end are substantially parallel. In any form of the invention the peripheral surfaces following the cutting edges of the teeth into work are small or substantially entirely removed from contact with the work so that seizing or freezing of metal from the work on the lands of the teeth is substantially eliminated and, as a result, the cut surface will be relatively smooth.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A rotary tool comprising a relatively thin body having axially extending teeth projecting therefrom with cutting edges at one end thereof extending in the same plane and normal to the tool axis, the lands of said teeth lying on a circle struck from the axis of tool rotation and the sides of each tooth being substantially parallel.

2. A rotary tool comprising a relatively thin body with axially extending teeth projecting therefrom, the sides of the tool being normal to the axis of tool rotation, the lands of the teeth lying on a circle struck from the axis of tool rotation and the sides of each tooth being parallel adjacent the land.

3. A rotary disk tool comprising a body having axially extending teeth projecting therefrom with unrelieved end cutting edges extending in the same plane normal to the tool axis, the lands of said teeth lying on a circle struck from the axis of tool rotation and the sides of each tooth being substantially parallel throughout their length.

4. A rotary tool comprising a body and teeth extending the full axial length thereof and forming unrelieved cutting edges at the forward end of the tool, the ends of the teeth forming the cutting edges being normal to the tool axis, the lands of the teeth lying on a circle struck from the tool axis and the sides of each tooth being substantially parallel their entire length.

5. A cutter comprising a cylindrical member having teeth with unrelieved forward cutting edges extending normal to the cutter axis, said teeth being of a circumferential thickness adjacent the cutting edges so that the teeth will bend slightly circumferentially in operation.

6. A rotary tool comprising a thin body having projecting teeth extending axially the full length thereof, the front ends of said teeth forming coplanar cutting edges normal to the axis of tool rotation, said teeth increasing in circumferentially of the tool from their front ends toward their rear ends with the front ends thin enough circumferentially to flex during operation of the cutting edges upon work.

7. A rotary tool comprising a thin body having projecting teeth extending axially the full length thereof, the front end of said teeth and body being in the same plane and formed normal to the axis of the tool, the sides of each tooth diverging in a direction axially of the tool and from the front end.

8. A rotary tool comprising a thin body having projecting teeth extending axially the full length thereof, the teeth lands being formed to lie in a circle struck from the tool axis and increasing in circumferential dimension toward the rear ends.

9. A rotary boring tool comprising a flat circular metal disk having parallel faces and having its periphery formed by alternate teeth and flutes, the side walls of each tooth being substantially parallel and the leading end of each tooth being a flat surface coplanar with the corresponding face of said disk, and each said leading end having a substantially radially extending cutting edge constituted by the intersection of said flat end surface and the wall of the adjacent flute, whereby all of said edges are in a single plane.

10. A rotary boring tool comprising a cylindrical metal member having parallel end faces and having its periphery formed by alternate teeth and flutes, the leading end of each of said teeth being a flat surface coplanar with the leading end of every other tooth of the member, said flat ends intersecting the forward faces of the teeth to form cutting edges, the top of each of said teeth forming a land of small extent circumferentially, and said teeth being sufficiently flexible to give in a direction circumferentially of the tool in a direction opposite that of the tool rotation when boring whereby the tops of the teeth will lie generally inside of a circle defined by the outer ends of the cutting edges.

11. A rotary boring cutter comprising a metal member having peripheral teeth extending axially therefrom, the ends of the teeth adjacent their peripheries being flat and in the same plane, said flat ends intersecting the forward faces of the teeth to form cutting edges and the top of each tooth forming a land of small extent circumferentially, and said teeth being flexible circumferentially when boring so that the major portion of the lands lie inside of the path of the cutting edges.

12. A rotary tool comprising a body having axially extending teeth projecting therefrom with cutting edges at one end thereof in a plane normal to the tool axis, the lands of said teeth lying on a circle struck from the axis of tool rotation and being thin enough in a circumferential direction adjacent the cutting edges to flex during working operations whereby the lands of the teeth adjacent the cutting edges are moved interiorly from the work piece finished by the cutting edges.

JOHN M. CHRISTMAN.